United States Patent
Senakiewich, II et al.

(10) Patent No.: US 8,011,709 B2
(45) Date of Patent: Sep. 6, 2011

(54) TRIM PANEL ATTACHMENT ASSEMBLY WITH ANTI-ROTATION FLANGE

(75) Inventors: Ronald C. Senakiewich, II, Royal Oak, MI (US); Mozaffar Roshanfar, Mur, TN (US)

(73) Assignee: Nissan North America, Inc., Franklin, TN (US)

( * ) Notice: Subject to any disclaimer, the term of this patent is extended or adjusted under 35 U.S.C. 154(b) by 116 days.

(21) Appl. No.: 12/562,424

(22) Filed: Sep. 18, 2009

(65) Prior Publication Data

US 2011/0067206 A1    Mar. 24, 2011

(51) Int. Cl.
*A44B 99/00* (2010.01)
*B60J 9/00* (2006.01)

(52) U.S. Cl. ........................................ 296/1.08; 24/289

(58) Field of Classification Search ................. 296/1.08, 296/193.06; 24/289, 453, 457, 458; 280/728.2, 280/730.2
See application file for complete search history.

(56) References Cited

U.S. PATENT DOCUMENTS

| | | | | |
|---|---|---|---|---|
| 6,886,874 B2* | 5/2005 | Abe | ............................. | 296/1.08 |
| 6,908,144 B2* | 6/2005 | Gotzinger et al. | ....... | 296/187.05 |
| 7,410,189 B2* | 8/2008 | Choi | ........................... | 280/730.2 |
| 7,654,558 B2* | 2/2010 | Choi | ........................... | 280/728.2 |
| 7,717,458 B2* | 5/2010 | Tsuge | ........................ | 280/728.2 |
| 7,722,113 B2* | 5/2010 | Kamiya et al. | ............ | 296/187.05 |
| 7,841,636 B2* | 11/2010 | Huth et al. | .................... | 296/1.08 |
| 2004/0084918 A1* | 5/2004 | Brandt et al. | ................ | 296/1.08 |
| 2004/0113401 A1* | 6/2004 | Ryu | ........................... | 280/730.2 |
| 2007/0114766 A1* | 5/2007 | Hwang | ....................... | 280/730.2 |
| 2008/0066266 A1* | 3/2008 | Scroggie et al. | ................ | 24/297 |
| 2008/0073924 A1* | 3/2008 | Sakamoto | .................... | 296/1.08 |
| 2009/0256373 A1* | 10/2009 | Fukui et al. | .................. | 296/1.08 |

* cited by examiner

*Primary Examiner* — Lori Lyjak
(74) *Attorney, Agent, or Firm* — Young Basile

(57) ABSTRACT

An attachment assembly for connecting an interior trim panel to a structural pillar of a vehicle includes a first connecting portion and a second connecting portion. The first connecting portion is connectable to the second connecting portion such that a first engagement structure of the first engagement portion is in engagement with a second engagement structure of the second engagement portion to secure the first connecting portion with respect to the second connecting portion. When the first and second connecting portions are connected, a base surface of the first connecting portion is in engagement with a shoulder of the second connecting portion, and a flange of the first connecting portion is in engagement with an upstanding wall of the second connecting portion to restrain movement of the first connecting portion and the second connecting portion with respect to one another.

20 Claims, 3 Drawing Sheets

TRIM PANEL ATTACHMENT ASSEMBLY WITH ANTI-ROTATION FLANGE

FIELD OF THE INVENTION

The invention relates to the field of attachment structures for vehicle interior panels, and more particularly, to an attachment assembly that resists rotation of a trim panel with respect to a vehicle structure.

BACKGROUND OF THE INVENTION

In motor vehicles, it is known to provide coverings, such as trim panels, carpeting, and headliners, on interior surfaces within the passenger compartment of the vehicle. In addition to providing a finished appearance to the interior the vehicle, such coverings also conceal and protect the wiring harnesses, ductwork, and functional components of the vehicle systems that are provided in and around the passenger compartment of the vehicle.

In the case of trim panels, and especially in the case of substantially rigid trim panels, it is necessary to securely fasten the trim panel to the underlying vehicle structure. In most cases, the fastening structures utilized to connect a trim panel to the vehicle structure should minimize or eliminate motion of the trim panel with respect to the vehicle structure.

Fastening structures for trim panels are known that are themselves concealed by the trim panel. One common design includes a post that is formed on an inner surface of the trim panel. The post is received in an aperture that is defined through the vehicle structure, or through a bracket that is connected to the vehicle structure. The post itself may be formed to resiliently engage the area adjacent to the aperture to secure the trim panel to the vehicle structure, or a spring clip may be placed on the post for this purpose.

In such a fastening structure, the tendency of the post to pivot within the aperture can be overcome by providing a sufficiently large surface at the base of the post that engages the area around the aperture. However, where the panel in question is narrow, provision of such a surface is rendered difficult. One example of such a panel is the A-pillar (or front structural pillar) of a vehicle, which is necessarily narrow and elongate. In an A-pillar, there is limited area in a direction transverse to the long dimension of the pillar to provide engagement between the pillar and the trim panel. When vehicle components, such as an airbag, a wiring harness, or a fluid duct, must be routed through a hollow cavity defined between the pillar and the trim panel, there may be little engagement area in the transverse direction.

It would be desirable to provide an attachment assembly that resists rotation of a trim panel with respect to a vehicle structure while allowing routing of vehicle components therebetween.

SUMMARY

Attachment assemblies for connecting an interior trim panel to a structural pillar of a vehicle are taught herein. One attachment assembly taught herein includes a first connecting portion and a second connecting portion. The first connecting portion has a base portion having a base surface formed thereon, a first engagement structure formed on the base portion, and a flange that is connected to the base portion and extends outward with respect to the first base surface. The second connecting portion has a support surface, an upstanding wall that extends outward from the support surface, a shoulder that is spaced from the support surface by the upstanding wall, and a second engagement structure that is adjacent to the shoulder.

The first connecting portion is connectable to the second connecting portion such that the first engagement structure is in engagement with the second engagement structure to secure the first connecting portion with respect to the second connecting portion. When the first and second connecting portions are connected, the base surface of the first connecting portion is in engagement with the shoulder of the second connecting portion, and the flange of the first connecting portion is in engagement with the upstanding wall of the second connecting portion to restrain movement of the first connecting portion and the second connecting portion with respect to one another.

The first engagement structure could define an aperture where at least a portion of the second engagement structure is receivable within the aperture. Additionally, the attachment assembly could be configured such that engagement of the shoulder of the second connecting portion with the base surface of the first connecting portion limits the maximum degree of insertion of the second engagement structure into the aperture of the first engagement structure. Furthermore, the second engagement structure could include a post that extends outward with respect to the shoulder and is adapted to engage the aperture of the first engagement structure. The second engagement structure could include a spring clip that is adapted to engage the aperture of the first engagement structure.

The flange of the first connecting portion and the upstanding wall of the second connecting portion could define a pair of substantially planar surfaces that are in direct facing engagement with one another. Additionally, the flange of the first connecting portion could extend generally perpendicular to the base surface of the first connecting portion, the upstanding wall of the second connecting portion could extend generally perpendicular to the support surface of the second connecting portion, and the shoulder of the second connecting portion could extend generally perpendicular to the upstanding wall of the second connecting portion.

The first connecting portion could be a bracket that is rigidly connected to the structural pillar of the vehicle. Alternatively, the first connecting portion could be formed integrally with the structural pillar of the vehicle.

The second connecting portion could be disposed on an inner side of the trim panel. Furthermore, at least a portion of the second connecting portion could be formed integrally with the trim panel.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
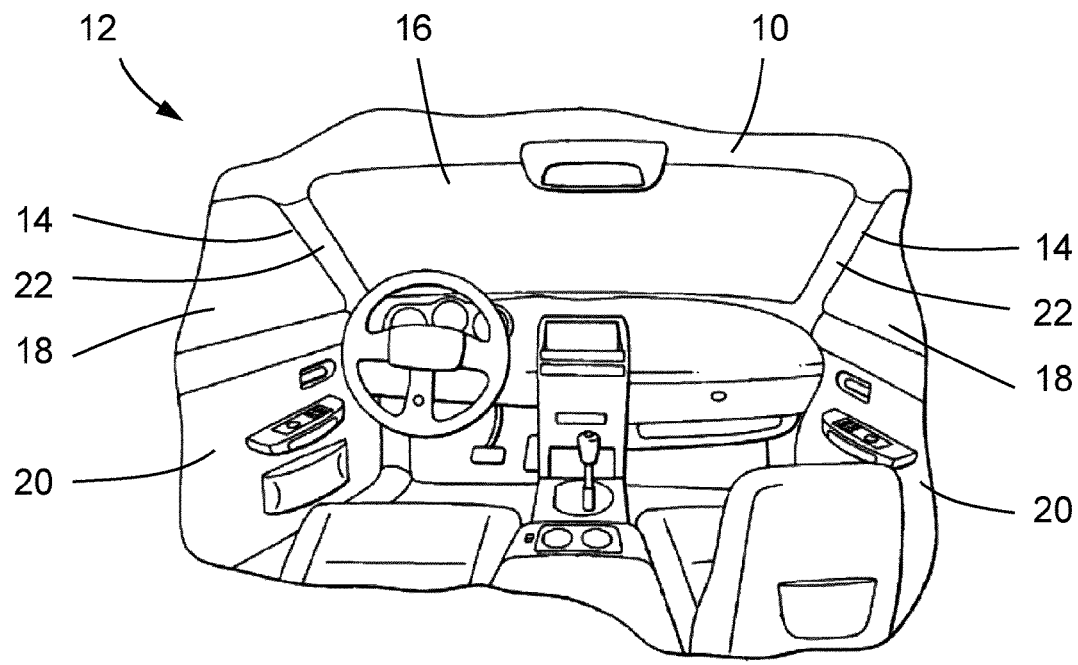
FIG. 1 is an illustration depicting a passenger compartment of a vehicle having a trim panel installed therein.

FIG. 1 shows a passenger compartment 10 of a motor vehicle 12. The motor vehicle 12 has a vehicle body structure that includes a plurality of structural pillars, including a pair of front structural pillars or A-pillars 14. The A-pillars 14 are situated at a front end of the passenger compartment 10, at each end of the windshield 16 of the motor vehicle 12. More particularly, each of the A-pillars 14 is situated between the windshield 16 and a side door window 18 and/or a frame portion of one of a pair of front doors 20 of the motor vehicle 12. An interior trim panel 22 is provided on each of the A-pillars 14, such that the A-pillars 14 are concealed from view within the passenger compartment 10 of the motor vehicle 12.

Figure 2:
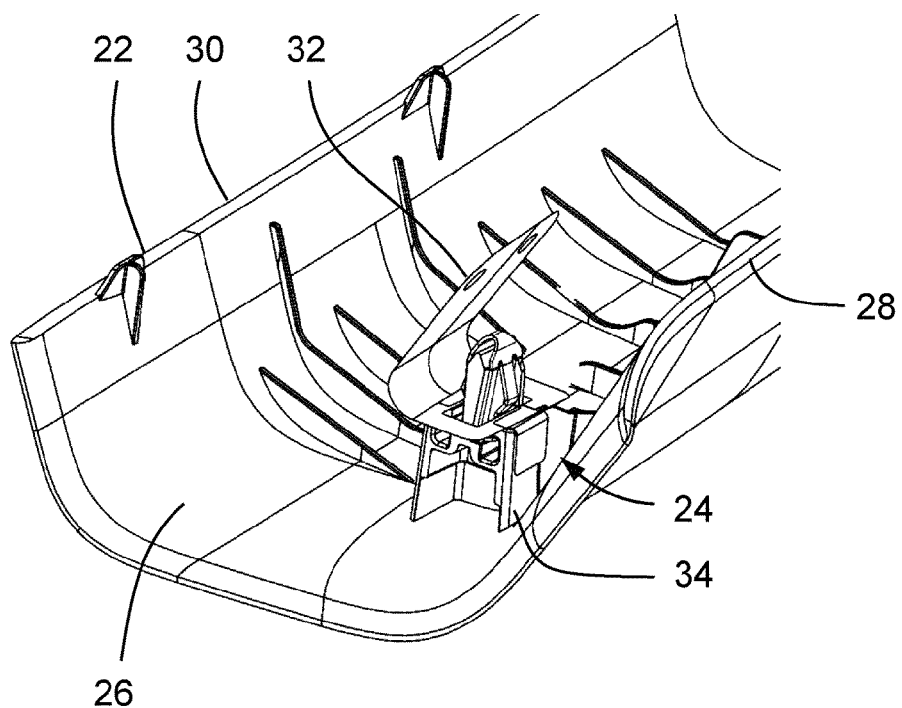
FIG. 2 is a perspective view showing an attachment assembly according to an embodiment of the invention disposed on the trim panel.
Figure 3:
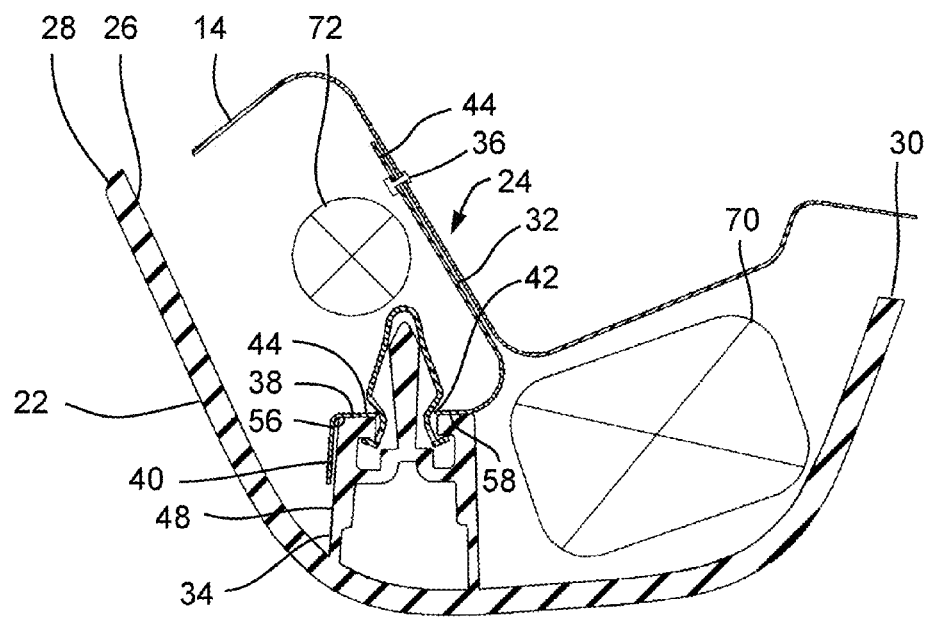
FIG. 3 is a cross-sectional view showing attachment of a trim panel to a structural pillar of the vehicle using the attachment assembly of FIG. 2.

As shown in FIGS. 2-3, an attachment assembly 24 provides at least one point of connection between the interior trim panel 22 and the A-pillar 14 of the motor vehicle 12. In particular, the interior trim panel 22 is elongate, such that it may extend along the A-pillar 14, and the interior trim panel 22 extends between a first elongate lateral edge 28 and a second elongate lateral edge 30. The first elongate lateral edge 28 and the second elongate lateral edge 30 are spaced with respect to one another in a direction transverse to a longitudinal axis of the interior trim panel 22.

The attachment assembly 24 is positioned between an inner surface 26 of the trim panel 22 and the A-pillar 14. Furthermore, the attachment assembly 24 is positioned at an intermediate location with respect to the first elongate lateral edge 28 and the second lateral edge 30 of the interior trim panel 22.

The attachment assembly 24 includes a first connecting portion, such as a bracket 32, that is adapted to securely engage a second connecting portion, such as a clip tower 34. The bracket 32 and the clip tower 34 are selectively engageable with one another in a secure manner to connect the interior trim panel 22 to the A-pillar 14 of the motor vehicle 12. The bracket 32 may be rigidly connected to the A-pillar 14 of the motor vehicle 12 by one or more rivets 36 or other conventional fasteners, or the bracket 32 may be formed integrally with the A-pillar 14. Similarly, the clip tower 34 is disposed on the inner surface 26 of the trim panel 22 and can be connected to the inner surface 26 of the trim panel 22 by conventional means such as adhesives or fasteners or can be formed integrally with the trim panel 22.

Figure 4:
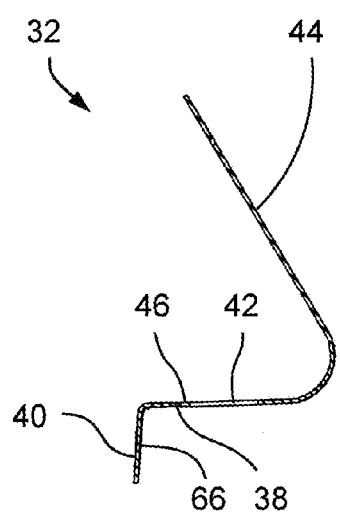
FIG. 4 is a detail view showing a bracket of the attachment assembly of FIG. 2.

As best shown in FIG. 4, the bracket 32 includes a first leg 44, a base portion or second leg 46, and a flange 40. A base surface 38 that is adapted to face the clip tower 34 is disposed on the second leg 46, and the flange 40 extends outward from the base surface 38. In particular, the flange 40 of the bracket 32 extends at an angle with respect to the base surface 38 of the bracket 32 and can extend generally perpendicular to the base surface 38. Both the base surface 38 and the flange 40 of the bracket 32 are engageable with the clip tower 34. In addition, an aperture 42 is defined by the second leg 46 of the bracket 32 and extends through the base surface 38 of the bracket 32. The aperture 42 in the base surface 38 serves as an engagement structure for engaging the clip tower 34, and more particularly, at least a portion of the clip tower 34 is receivable within the aperture 42 for engagement with the second leg 46 of the bracket.

The bracket 32 is rigidly connected to the A-pillar 14 by securing the first leg 44 of the bracket 32 in a direct facing relationship with the A-pillar 14 using the rivets 36. The second leg 46 extends at an angle with respect to the first leg 44 of the bracket 32. The flange 40 of the bracket 32 extends outward from the second leg 46 and the base surface 38, and the flange 40 may extend generally perpendicular to the second leg 46 and the base surface 38.

Figure 5:
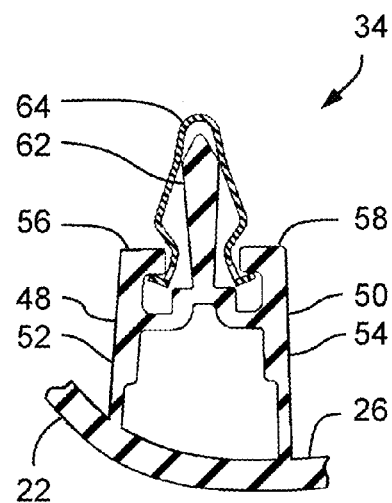
FIG. 5 is a detail view showing a clip tower of the attachment assembly of FIG. 2.

As shown in FIG. 5, the clip tower 34 includes a first upstanding wall 48 and a second upstanding wall 50 that each extend outward from the inner surface 26 of the trim panel 22, which serves as a support surface of the clip tower 34. The first upstanding wall 48 and the second upstanding wall 50 define a first substantially planar surface 52 and a second substantially planar surface 54 that face the first elongate lateral edge 28 and the second elongate lateral edge 30 of the trim panel 22, respectively. The first upstanding wall 48 and the second upstanding wall 50 terminate at a first shoulder portion 56 and a second shoulder portion 58, respectively.

The first shoulder 56 and the second shoulder 58 of the clip tower 34 are each spaced from the inner surface 26 of the trim panel 22 by the first upstanding wall 48 and the second upstanding wall 50, respectively. The first shoulder 56 and the second shoulder 58 each extend substantially perpendicular to both the first upstanding wall 48 and the second upstanding wall 50.

The clip tower 34 also includes a recessed post 62 that is disposed between the first shoulder 56 and the second shoulder 58 such that the recessed post 62 is adjacent to the first shoulder 56 and the second shoulder 58 and extends outward therefrom. A spring clip 64 is disposed on the recessed post 62 and is retained thereon by engagement with an underside of each of the first shoulder 56 and the second shoulder 58. The spring clip 64 is provided for engagement with the bracket 32; however, it should be understood that the spring clip 64 could be omitted by configuring the recessed post 62 such that it is adapted to resiliently engage the bracket 32.

Referring again to FIG. 3, the bracket 32 of the attachment assembly 24 is connectable to the clip tower 34 such that the spring clip 64 of the clip tower 34 is disposed at least partially within the aperture 42 of the bracket 32. Furthermore, the spring clip 64 is configured such that it engages the bracket 32 adjacent to the aperture 42 to resist disengagement of the clip tower 34 from the bracket 32, thus securing the interior trim panel 22 with respect to the A-pillar 14 of the motor vehicle 12. Engagement of the first shoulder 56 and the second shoulder 58 with the base surface 38 of the bracket 32 limits the maximum degree of insertion of the recessed post 62 and the spring clip 64 into the aperture 42 of the bracket 32.

When the clip tower 34 of the attachment assembly is engaged with the bracket 32 of the attachment assembly 24, the base surface 38 of the bracket 32 is in engagement with one or both of the shoulders 56, 58 of the clip tower 34. In addition, the first upstanding wall 48 of the clip tower 34, which faces toward the first elongate lateral edge 28 of the interior trim panel 22, is in engagement with the flange 40 of the bracket 32. More particularly, the substantially planar surface 52 defined by the first upstanding wall 48 is in direct facing engagement with and substantially coplanar to a substantially planar engagement surface 66 that is defined on the flange 40. This engagement with the flange 40 with the first upstanding wall 48 of the clip tower 34 at least partially restrains the interior trim panel 22 of the motor vehicle 12 against rotation with respect to the A-pillar 14 of the motor vehicle 12 in the direction that is toward and substantially transverse to the first elongate lateral edge 28 of the interior trim panel 22. Additionally, although the figures show a single flange 40 that engages the first upstanding wall 48 of the clip tower 34, it should be understood that the bracket 32 could include an additional flange 40 that is configured to engage the second upstanding wall 50 of the clip tower 34 in order to restrain the interior trim panel 22 of the motor vehicle 12 against rotation with respect to the A-pillar 14 in the direction that is toward and substantially transverse to the second elongate lateral edge 30 of the interior trim panel 22.

Figure 6:
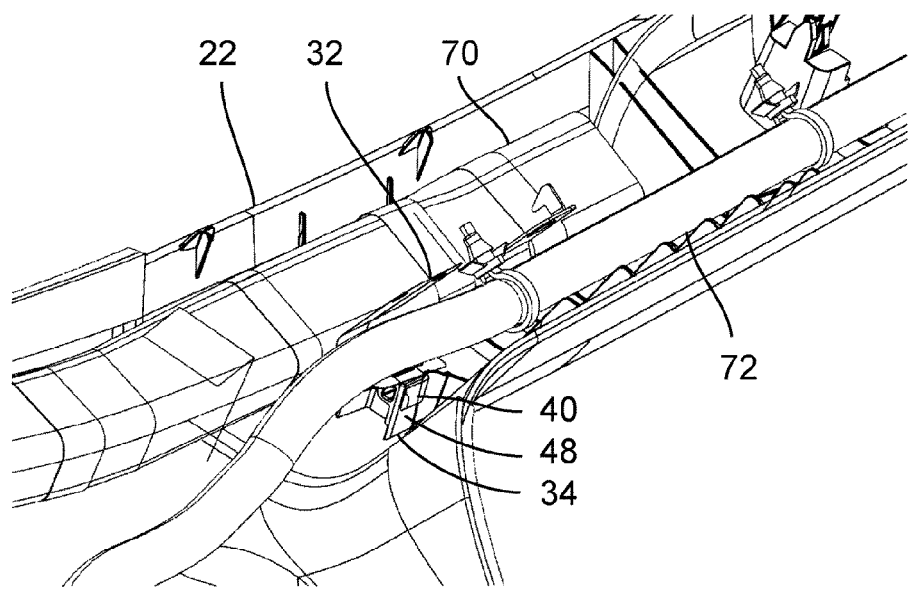
FIG. 6 is a perspective view of the trim panel showing vehicle components disposed adjacent to the attachment assembly.

As shown in FIG. 6, by providing engagement between the flange 40 of the bracket 32 and the first upstanding wall 48 of the clip tower 34, motion of the interior trim panel 22 with respect to the A-pillar 14 is at least partially restrained. Thus, the total engagement area between the bracket 32 and the clip tower 34 can be reduced without allowing unwanted lateral rotation of the interior trim panel 22 with respect to the A-pillar 14. By doing this, it becomes possible to provide an increased amount of space between the interior trim panel 22 and the A-pillar 14 in which one or more vehicle components 70, 72, such as an airbag assembly, a wire harness, or a fluid duct, may be disposed directly adjacent to the clip tower 34, as well as the inner surface 26 of the interior trim panel 22. In addition, by providing the bracket 32 as a portion of the attachment assembly 24, the geometric configuration of the bracket 32 allows a wiring harness 72 to be positioned directly above the clip tower 34 in interposition between the clip tower 34 and the A-pillar 14 of the motor vehicle 12.

Figure 7:
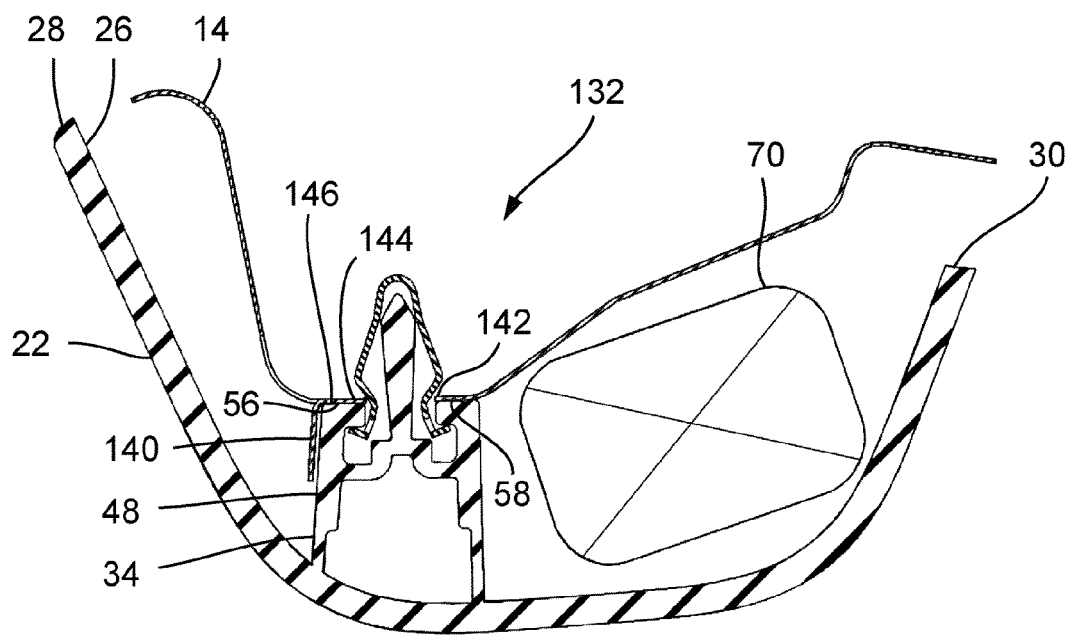
FIG. 7 is a cross-sectional view showing attachment of the trim panel to a structural pillar of the vehicle using an attachment assembly according to an alternative embodiment of the invention.

As noted previously, and as shown in FIG. 7, the bracket 32 may be omitted in lieu of integral bracket 132 that is formed on the A-pillar 14 of the motor vehicle 12. The integral bracket 132 includes an aperture 142 that extends through and is defined by a base portion 144 of the A-pillar 14, as well as a flange 140 that is formed integrally with the A-pillar 14, such as by punching and bending, to allow engagement between a base surface 146 of the base portion 144 and one or both of the shoulders 56, 58 of the clip tower 34, as well as between the flange 140 and the first upstanding wall 48 of the clip tower 34, as described in connection with the base surface 38 and the flange 40 in the embodiment shown in FIGS. 2-3. As in the embodiment of FIGS. 2-3, clearance is provided adjacent to the clip tower 34 and between the interior trim panel 22 and the A-pillar 14 for a vehicle component such as an airbag assembly 70.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An attachment assembly for connecting an interior trim panel to a structural pillar of a vehicle, comprising:
   a first connecting portion including a base portion having a base surface and a first engagement structure formed thereon, and a flange connected to the base portion and extending outward with respect to the base surface; and
   a second connecting portion including a support surface, an upstanding wall that extends outward from the support surface, a shoulder that is spaced from the support surface by the upstanding wall, and a second engagement structure that is adjacent to the shoulder,
   wherein the first connecting portion is connectable to the second connecting portion such that the first engagement structure is in engagement with the second engagement structure to secure the first connecting portion with respect to the second connecting portion, the base surface of the first connecting portion is in engagement with the shoulder of the second connecting portion, and the flange of the first connecting portion is in engagement with the upstanding wall of the second connecting portion to restrain movement of the first connecting portion and the second connecting portion with respect to one another.

2. The attachment assembly of claim 1, wherein the first engagement structure defines an aperture and at least a portion of the second engagement structure is receivable within the aperture.

3. The attachment assembly of claim 2, wherein engagement of the shoulder of the second connecting portion with the base surface of the first connecting portion limits the maximum degree of insertion of the second engagement structure into the aperture of the first engagement structure.

4. The attachment assembly of claim 2, wherein the second engagement structure includes a post that extends outward with respect to the shoulder and is adapted to engage the aperture of the first engagement structure.

5. The attachment assembly of claim 2, wherein the second engagement structure includes a spring clip and is adapted to engage the aperture of the first engagement structure.

6. The attachment assembly of claim 1, wherein the flange of the first connecting portion and the upstanding wall of the second connecting portion define a pair of substantially planar surfaces that are in direct facing engagement with one another.

7. The attachment assembly of claim 1, wherein the flange of the first connecting portion extends generally perpendicular to the base surface of the first connecting portion, the upstanding wall of the second connecting portion extends generally perpendicular to the support surface of the second connecting portion, and the shoulder of the second connecting portion extends generally perpendicular to the upstanding wall of the second connecting portion.

8. The attachment assembly of claim 1, wherein the first connecting portion is a bracket that is rigidly connected to the structural pillar of the vehicle.

9. The attachment assembly of claim 1, wherein the first connecting portion is formed integrally with the structural pillar of the vehicle.

10. The attachment assembly of claim 1, wherein the second connecting portion is disposed on an inner surface of the trim panel.

11. The attachment assembly of claim 10, wherein at least a portion of the second connecting portion is formed integrally with the trim panel.

12. An attachment assembly for connecting an interior trim panel having a pair of spaced elongate edges to a structural pillar of a vehicle, comprising:
    a first connecting portion disposed on the structural pillar, the first connecting portion having a base portion including a base surface formed thereon, a first engagement structure defined by the base portion, and a flange connected to the base portion and extending outward with respect to the base surface; and
    a second connecting portion disposed on an inner surface of the trim panel, the second connecting portion including an upstanding wall that extends outward from the inner surface of the trim panel, a shoulder that is spaced from the inner surface of the trim panel by the upstanding wall, and a second engagement structure that is adjacent to the shoulder, wherein the first connecting portion is connectable to the second connecting portion such that the first engagement structure is in engagement with the second engagement structure to secure the first connecting portion with respect to the second connecting portion, the base surface of the first connecting portion is in engagement with the shoulder of the second connecting portion, and the flange of the first connecting portion is in engagement with the upstanding wall of the second connecting portion to restrain movement of the first connecting portion and the second connecting portion with respect to one another.

13. The attachment assembly of claim 12, wherein the upstanding wall of the second connecting portion faces toward one of the spaced elongate edges of the trim panel, such that engagement of the flange of the first connecting portion with the upstanding wall of the second connecting portion restrains motion of the second connecting portion with respect to the second connecting portion in at least one direction that is substantially transverse to the pair of spaced elongate edges of the trim panel.

14. The attachment assembly of claim 12, wherein the first engagement structure includes an aperture, the second engagement structure includes a post and a spring-clip disposed on the post, and the second engagement structure is receivable within the aperture such that the spring clip engages the first engagement structure to resist disengagement of the second engagement structure from the first engagement structure.

15. The attachment assembly of claim 12, wherein the flange of the first connecting portion and the upstanding wall of the second connecting portion define a pair of substantially planar surfaces that are in direct facing engagement with one another.

16. The attachment assembly of claim 12, wherein the flange of the first connecting portion extends generally perpendicular to the base surface of the first connecting portion, the upstanding wall of the second connecting portion extends generally perpendicular to the inner surface of trim panel, and the shoulder of the second connecting portion extends generally perpendicular to the upstanding wall of the second connecting portion.

17. The attachment assembly of claim 12, wherein the first connecting portion is a bracket that is rigidly connected to the structural pillar of the vehicle and at least a portion of the second connecting portion is formed integrally with the trim panel.

18. A vehicle, comprising:
a structural pillar of the vehicle;
a trim panel that covers at least a portion of the structural pillar of the vehicle, the trim panel having an inner surface and a pair of spaced elongate edges;
a bracket rigidly connected to the structural pillar, the bracket including a base portion having a base surface formed thereon, an aperture that extends through the base portion, and a flange that is connected to the base portion and extends outward with respect to the base surface; and
a clip tower including a body portion that is formed integrally with the trim panel, the body portion including an upstanding wall that extends outward from the inner surface of the trim panel, a shoulder that is spaced from the inner surface of the trim panel by the upstanding wall, a post that is adjacent to the shoulder and extends outward with respect to the shoulder, and a spring-clip disposed on the post,
wherein the bracket is connectable to the clip tower such that the spring clip of the clip tower is disposed at least partially within the aperture of the bracket such that the spring clip engages the bracket to resist disengagement of the clip tower from the bracket to secure the trim panel with respect to the structural pillar, the base surface of the bracket is in engagement with the shoulder of the clip tower, and the upstanding wall of the clip tower faces toward one of the spaced elongate edges of the trim panel and is in engagement with the flange of the bracket, such that engagement of the flange of the bracket with the upstanding wall of the clip tower restrains motion of trim panel with respect to the structural pillar in at least one direction that is substantially transverse to the pair of spaced elongate edges of the trim panel.

19. The vehicle of claim 18, further comprising:
a vehicle component disposed between the structural pillar and the trim panel, wherein the vehicle component is disposed directly adjacent to the clip tower.

20. The vehicle of claim 19, wherein the vehicle component is at least one of an airbag, a wiring harness, or a fluid duct.

* * * * *